UNITED STATES PATENT OFFICE.

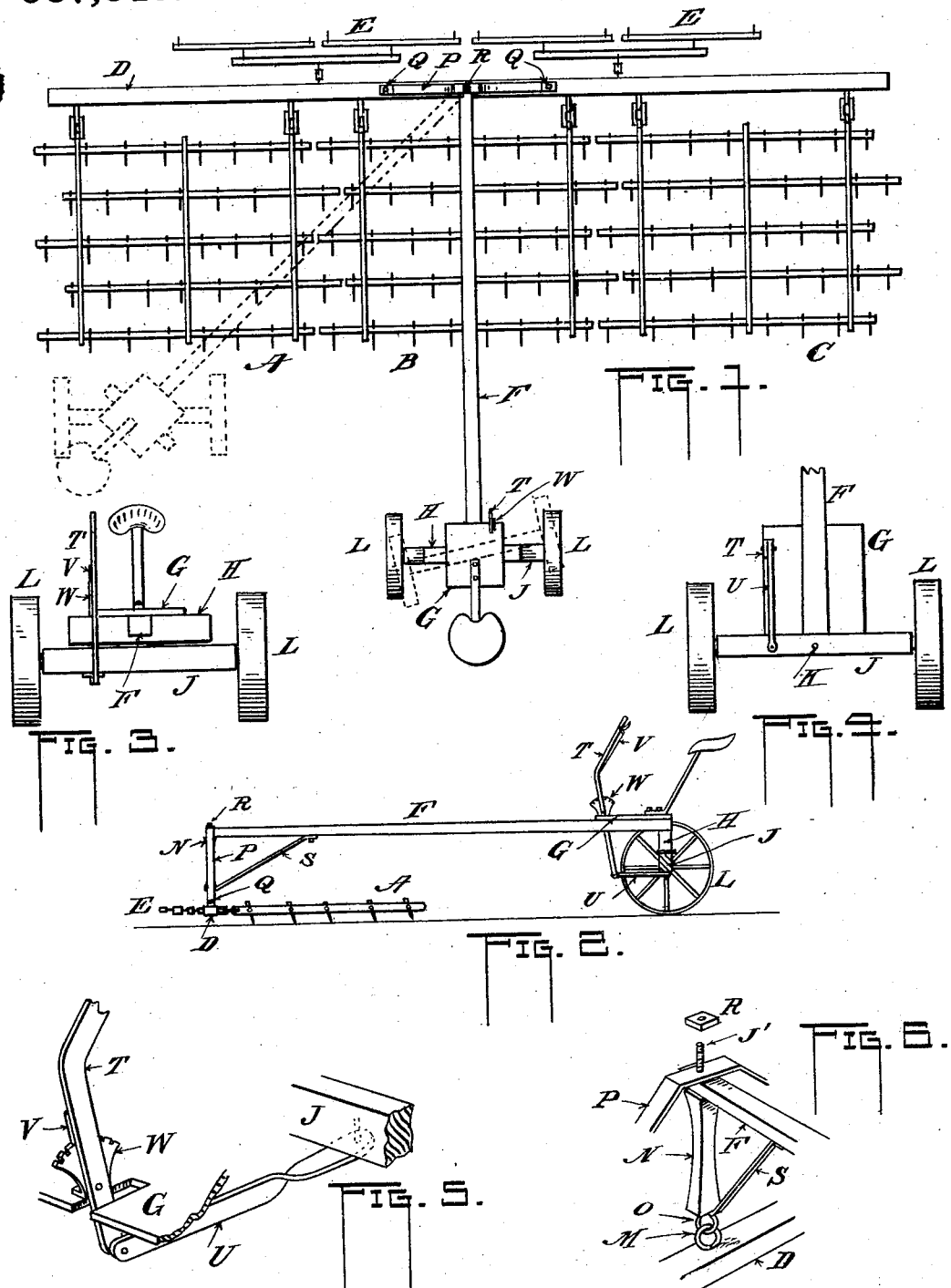

ESEK D. ORTON, OF ELMWOOD, ILLINOIS.

HARROW.

937,848.  Specification of Letters Patent.  Patented Oct. 26, 1909.

Application filed March 23, 1906. Serial No. 307,762.

*To all whom it may concern:*

Be it known that I, ESEK D. ORTON, a citizen of the United States, residing at Elmwood, in the county of Peoria and State of Illinois, have invented certain new and useful Improvements in Harrows; and I do hereby declare that the following is a full, clear, and exact description of the invention, which will enable others skilled in the art to which it appertains to make and use the same.

This invention pertains to improvements in riding harrows; relating more particularly to improvements in riding attachments for the same.

The invention has for its object to provide a riding cart for harrows and analogous devices which can be adjusted so as to reach and maintain a position behind any part of the said harrow or other form of said stirring device.

Another object is to provide a riding cart for a harrow that will follow behind the center of the harrow or any part thereof.

Another object is to provide a riding cart for a harrow, the wheels of which can be turned at an angle relative to the tongue while following behind the center of the harrow in order to cause the cart to leave its central position and move toward either side of each position.

A further object is to provide a riding cart shiftable from a central position behind the harrow to a position at one side of said central position in order that the rider can see ahead of the horses and thereby determine what particular course to drive over.

Another object is to provide a riding cart for harrows that will be shiftable in the manner described whereby the rider can cause the cart to move to windward and thus avoid dust created by the horses and the implement.

In the appended drawing, Figure 1 is a top view of a harrow showing my harrow cart connected therewith. Fig. 2 is a side elevation of the same. Fig. 3 is a front view of the cart. Fig. 4 is a view of the underside thereof. Fig 5 is a perspective view of an axle swinging mechanism for the cart, and Fig. 6 is a perspective view of a support for the tongue or reach of the harrow cart.

The harrow sections are represented by the reference letters A, B, C, which are attached in suitable manner to a draft-bar D the latter having draft attachments E E of any desired and suitable arrangement. The harrow sections may be of any desired construction and may also have the usual adjusting levers which, however, are not shown since they do not form any part of my invention. At the middle of the draft-bar D just mentioned, is pivotally attached, at one end a reach or tongue F of considerable length extending rearwardly from its pivot. The rear end of said tongue has rigid relation with a bolster H on both of which a platform G is carried and affixed thereto. The bolster rests on an axle J having a pair of wheels L the two being pivoted together by means of a king-bolt K, Fig. 4, whereby the tongue and axle are free to swing relatively the purpose of which will be presently described.

Referring to the connection of the tongue with the draft-bar D, I have illustrated in the drawing suitable connections that would provide the desired pivotal relation. It consists first of an eye M secured in the draft-bar at the middle of the length thereof and above is a bar N having at its lower end a similar eye O to engage said eye M as clearly shown in Fig. 6. Upon the top of the member N rests the forward end of the tongue F and a stirrup or brace P, Figs. 1 and 6, rests upon said tongue, its ends being secured to the said draft-bar D as at Q, Fig. 1. A threaded stud J' carried in the member N extends upward through the tongue and the stirrup and receives a nut R. A brace S is secured at one end to the underside of the tongue and extends down at an angle to the lower end of the member N being secured thereto in any suitable manner. This member S forms a rigid brace between the tongue and member N as will be seen. Thus connected the draft-bar will draw the cart and while the axle remains at right angles to the reach, as shown in full lines in Fig. 1, the cart will travel in the central position excepting when turning out of a straight ahead course, when, of course it will naturally trail behind that side of the harrow that lies in the inside or shortest curve described by the implement as it turns out of the straight-ahead direction.

I shall now describe the means employed for causing the cart to assume a desired position at either side of its central normal position.

Pivoted upon the platform G, is a lever T which extends both above and below its pivot as shown, its lower end having pivotally connected thereto one end of a link or bar U, whose other end is pivoted to the axle immediately in the rear of the lever, Fig. 4. The upper end of the lever has a latch V for engaging a notched quadrant W upon the platform by which means the lever can be set and sustained in any desired position, having regard to the angle at which the axle and wheel are to be set as will appear presently. Since the platform is rigidly carried by the tongue and bolster and the axle is pivoted relative to these two latter members it is evident that the lever when moved on its pivot will swing the axle and wheels. For instance, when the lever is pulled rearwardly or toward the rider, as viewed in Fig. 1, its lower end will move forward and thus shift the axle forward as shown in dotted lines in Fig. 1. If the lever is now locked in position by its latch the axle will be held in a fixed angle relative to the tongue. Now as the harrow moves forward, the wheels, having been placed at an angle to the line of movement, will cause the cart to move in the direction in which the wheels face. The effect of this is to carry the cart toward the left until its wheels finally become parallel to the line of advance. This sidewise travel causes the tongue to assume the angle shown in dotted lines it being evident that since the axle and said tongue are in effect locked together they must so remain. The extent of side travel depends, of course, upon the position the wheels are set with regard to the tongue; the greater the angle the farther the cart will travel in the sidewise direction since a greater distance must be traveled before the wheels finally become parallel to the draft line. When the operator becomes familiar with the various positions of the lever and the positions of the cart corresponding he can readily determine how to set the lever in order to take up a given position. By bringing the axle at right angle to the tongue while in the position shown by the dotted lines the cart will immediately return to its central position. Or, if the axle be swung to the opposite angle the cart will at once move over to the opposite side of the harrow and finally remain in position therebehind or until the axle is again shifted. It is thus possible to see ahead of the horses at either side if desired, or if the harrow is making considerable dust as is the case in smoothing dry ground the driver can always ride to windward of it and not be annoyed thereby.

In turning out of a straight-ahead course the lever can be moved to swing the axle so as to steer the cart toward the outside of the harrow so that the wheels will not interfere with it. By having the point of the tongue or reach attached forward of the harrow a long swing is obtainable so that the cart can travel in an arc of considerable scope and greater than can be had with any device of this class of which I am aware. It is true, however, that it is not necessary to confine myself to the point of attachment of the tongue whether it be ahead of, above, or behind the harrow, since the invention contemplates any such changes of position so long as the results described can be attained. I do not wish to be confined, in fact to any of the structures since, for instance, means equivalent to the tongue described may be used, as well as an equivalent of the pivotal connection of the tongue and draft-bar, so also with respect to the means for swinging and for holding the wheels at an angle to the tongue and the planes of the wheels need not necessarily be fixed with regard to the axle since it is only necessary that the said wheels be freely adjustable relative to the line of advance.

To my knowledge, I am the first to provide a riding attachment for a harrow that can be made to travel between the extremes of the implement or that can be held at any extreme points for the purposes hereinbefore set forth.

Having described my invention, I claim:

1. The combination with a broad harrow structure, of a vehicle normally located centrally at some distance in rear of the same and connected thereto by devices permitting it to move from its normal position into close proximity with either lateral portion of said structure, and means whereby an occupant of the vehicle may cause and control such movements.

2. The combination with a transverse draft bar, of a harrow in the rear of the draft bar and secured thereto, a vehicle, at some distance in the rear of the harrow, provided with a seat and with wheels arranged for turning into planes oblique to the general line of advance, and a reach having its rear end secured to said vehicle and its forward end pivoted centrally upon said draw bar, the width of the harrow and length of the reach being such that the vehicle may swing approximately into contact with either end of the harrow's rear margin.

3. The combination with a transverse draft bar, of a harrow hinged to the same, a rearwardly extending reach pivoted centrally upon the draft bar, and adapted to reach approximately either end of the rear side of the harrow when swung to oblique position, a vehicle secured to the rear end of the reach and provided with a seat and with wheels arranged for turning into planes oblique to the reach, and a locking lever near the seat for controlling the turning of the wheels.

4. An implement of the class described comprising a harrow, a vehicle in the rear of the harrow and a draft device for the harrow, a reach pivotally carried by said device, extending rearward and connected to the vehicle, the axle of the cart being normally at right angles to the axis of the reach when following directly behind the harrow, and adapted for pivotal movement, whereby its wheels may be turned at an angle to the line of movement of the harrow causing the cart to move in an angling direction from a central position immediately behind the harrow to a position at one side of the central position the wheels assuming a position substantially parallel to the line of movement of the harrow when the cart has reached its limit of such movement.

5. An implement of the class described comprising a harrow, a vehicle in the rear of the harrow, the vehicle axle being adapted to turn beneath the body of the vehicle, at an angle to the line of movement of the harrow, a reach by which the vehicle is drawn, and means for swinging the axle at an angle to the reach; whereby the wheels are placed at an angle to the line of movement of the harrow, the axle fixed at said angle with reference to the reach, and the vehicle then moving in the direction in which the wheels are set, to take up its position as described, the wheels after reaching the desired position being substantially parallel to the line of movement of the harrow.

6. An implement of the class described, comprising the harrow, a reach pivoted at its forward end to swing in a horizontal plane said pivot being fixed with relation to the harrow, a wheeled vehicle secured to the rear end of the reach, the axle of the cart being adapted to pivot free of the reach, with its wheels rotating in fixed planes parallel to one another, and means for positively shifting the axle and wheels at an angle to the reach and thus holding them for the purposes set forth.

In testimony whereof I affix my signature, in presence of two witnesses.

ESEK D. ORTON.

Witnesses:
L. J. MARSH,
CLYDE STEENBURG.